(12) United States Patent
Wright et al.

(10) Patent No.: US 7,835,015 B1
(45) Date of Patent: Nov. 16, 2010

(54) AUTO FOCUS SYSTEM FOR RETICLE INSPECTION

(75) Inventors: Michael J. Wright, San Carlos, CA (US); Robert W. Walsh, Cupertino, CA (US); Daniel L. Belin, Cupertino, CA (US); David S. Alles, Los Altos, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 305 days.

(21) Appl. No.: 12/042,326

(22) Filed: Mar. 4, 2008

Related U.S. Application Data

(60) Provisional application No. 60/893,117, filed on Mar. 5, 2007.

(51) Int. Cl.
*G01B 11/24* (2006.01)
(52) U.S. Cl. .................................................... 356/609
(58) Field of Classification Search ......... 356/600–614, 356/445, 237.1–237.6; 716/4, 21; 430/4, 430/5, 30; 359/389, 368, 385, 565; 355/30, 355/35, 53
See application file for complete search history.

(56) References Cited

U.S. PATENT DOCUMENTS

| 5,656,182 | A  | * | 8/1997  | Marchman et al. ............. 430/4    |
| 5,831,736 | A  | * | 11/1998 | Lichtman et al. ............ 356/613   |
| 6,403,320 | B1 | * | 6/2002  | Read et al. ..................... 506/9 |
| 6,771,417 | B1 | * | 8/2004  | Wolleschensky et al. .... 359/368      |
| 6,809,793 | B1 | * | 10/2004 | Phan et al. ..................... 355/30 |
| 6,836,560 | B2 | * | 12/2004 | Emery ........................ 382/145   |
| 7,012,672 | B2 | * | 3/2006  | Van Rhee et al. ............. 355/53    |
| 7,174,520 | B2 | * | 2/2007  | White et al. ................... 716/4  |
| 7,273,685 | B2 | * | 9/2007  | Sasazawa et al. ............. 430/30    |
| 7,444,616 | B2 | * | 10/2008 | Sandstrom et al. ............ 716/21    |
| 7,623,227 | B2 | * | 11/2009 | Judell et al. .............. 356/237.2   |
| 2006/0268153 | A1 | * | 11/2006 | Rice et al. ................... 348/370 |

* cited by examiner

*Primary Examiner*—Sang Nguyen
(74) *Attorney, Agent, or Firm*—Luedeka, Neely & Graham, P.C.

(57) ABSTRACT

Methods and apparatus relating to the inspection of photomasks are described. In an embodiment, an inspection tool may be automatically focused on a reticle utilizing various topographic mapping techniques. Other embodiments are also described.

13 Claims, 4 Drawing Sheets

AUTO FOCUS SYSTEM FOR RETICLE INSPECTION

RELATED APPLICATIONS

This application is related to and claim priority to the Provisional U.S. Patent Application Ser. No. 60/893,117, filed Mar. 5, 2007, entitled "Auto Focus System for Reticle Inspection," which is incorporated herein by reference for all purposes.

FIELD

The subject matter described herein generally relates to reticle inspection. In one embodiment, techniques described herein may be used to provide an auto focus system for reticle inspection.

BACKGROUND

When manufacturing integrated circuit devices, one or more photomasks or reticles may be used. Generally a photomask may be an opaque plate with transparencies that allow light to shine through a defined pattern. The patterns in the photomask may define the patterns found in an integrated circuit device. If there are defects in the pattern, the integrated circuit device may not function properly. In order to find defects that may occur during the manufacturing process, it may be important to focus the inspection tool so that the image generated is accurate enough to allow for detection of defects.

BRIEF DESCRIPTION OF THE DRAWINGS

The accompanying drawings are included to provide further understanding of embodiments of the invention, illustrate various embodiments of the invention, and together with the description serve to explain the principles and operation of the invention. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of embodiments of the invention. Embodiments of the invention may be practiced without some or all of these specific details. In other instances, well known process operations have not been described in detail in order not to unnecessarily obscure embodiments of the invention.

Also, reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Some embodiments discussed herein may provide a mechanism for more accurate and/or efficient auto focusing during reticle inspection (which may be also referred to herein as a "photomask" or more generally a "mask"). In an embodiment, the auto focus system may track the top surface of the reticle during inspection. For example, in one embodiment, the topographic surface of the Quartz may be mapped (e.g., the altitude of the Quartz/chrome interface may be mapped). The map may be used to control the objective-lens to reticle distance during inspection of the reticle. In an embodiment, the topographic surface of the un-etched Quartz mask-blank may be determined and then used, e.g., with an appropriate offset, to control the auto focus system during the image-capture phase of reticle-inspection. Any drift in the focus offset from the initially-determined map may be measured periodically to correct for such things as changes in temperature in accordance with some embodiments.

In one embodiment, a triangulation-approach autofocus system may be used (as discussed below) in which the objective-lens to reticle-surface distance is determined by "triangulation" as the mask traversed the objective. For example, two counter-propagating, off-axis beams may be focused onto the same spot on the surface of the reticle. Their reflected images may be directed onto two split-diode detectors so that any defocus of the reticle results in equal-but-opposite displacements of the spots on the split photo-diodes. The amount of defocus may be determined by normalizing (for total intensity) the difference signals for both diodes.

Figure 4:
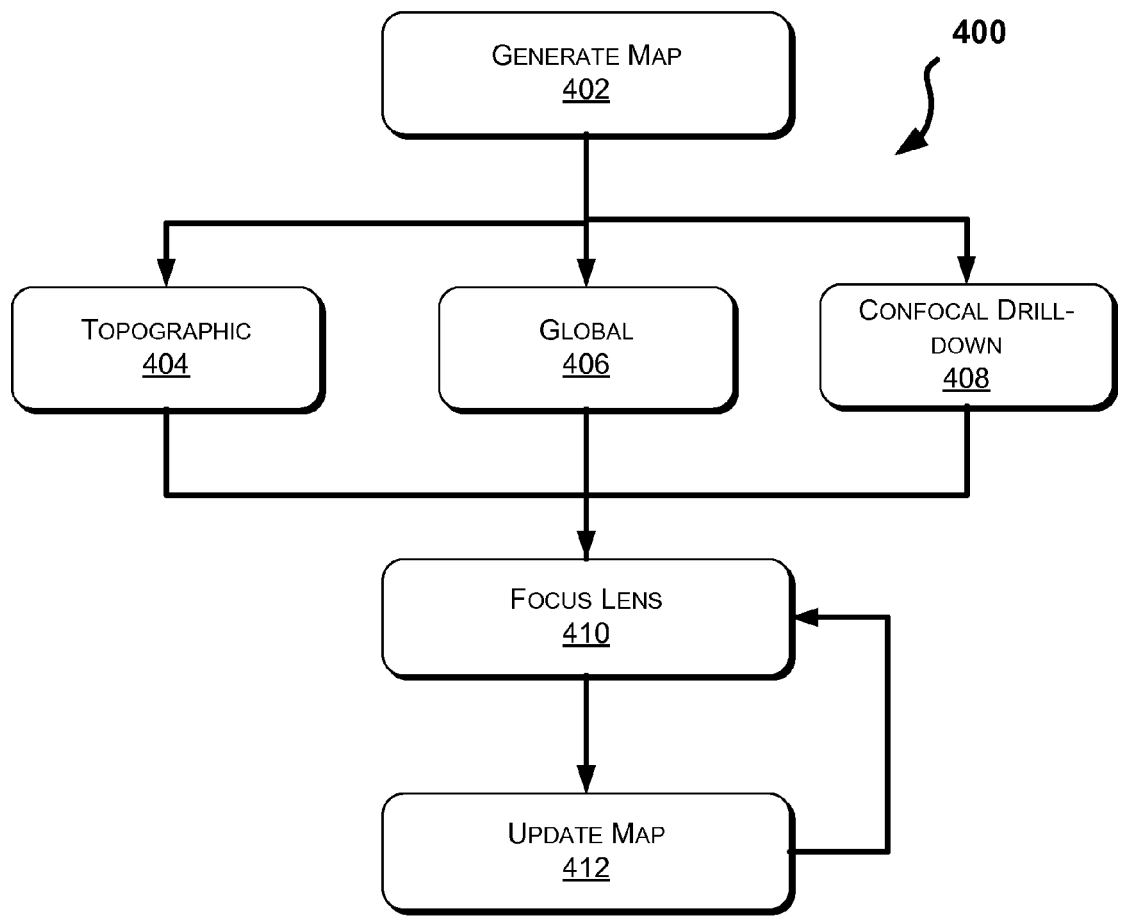
FIG. 4 is a flow diagram of a method to automatically focus a reticle inspection tool, according to an embodiment.

In some embodiments, the following methods of generating the map may be used (see, e.g., FIG. 4). Further, these methods may be used singly or in combination:

Step Removal (see, e.g., global mapping operation 406 of FIG. 4): As the triangulation-approach autofocus system (discussed above) traverses the reticle's surface, it senses the top surface of the reticle—e.g., made from one of various materials, including Chrome or Embedded Phase Shifting Mask EPSM or Quartz or etched Quartz. These steps may be abrupt and the un-etched quartz surface may be relatively flat so these steps may represent transitions from one material to another. As a result, the algorithm removes these steps thereby creating a two-dimensional (Z versus X) elevation map for each swath across the reticle. The reflectivity of the surface may give some indication of the material. In addition, a mask-material table for each mask-blank type may give the thicknesses and/or reflectivity of each layer of the mask. Multiple (e.g., 20) two-dimensional elevation maps (each at different Y locations) may be combined to produce a three dimensional map of the surface (Z versus X & Y).

Figure 1:
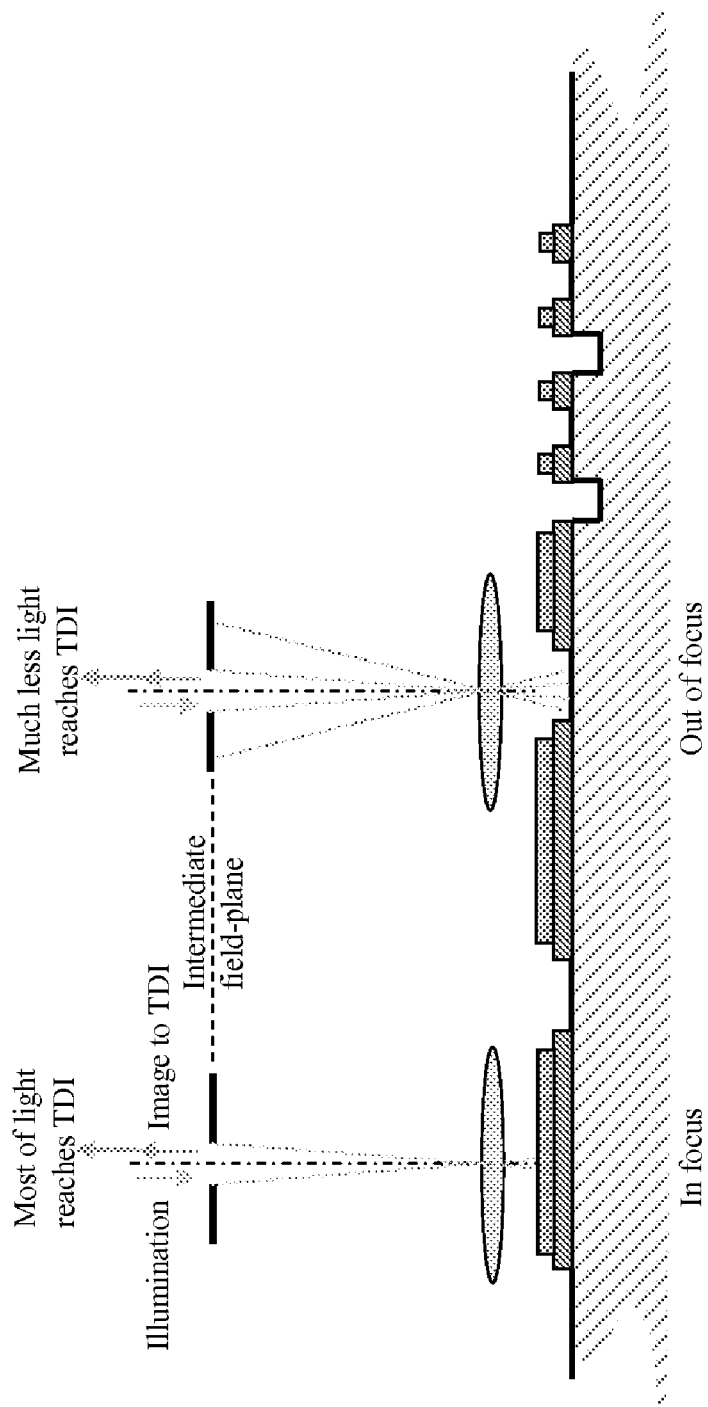
FIG. 1 illustrates in-focus and out-of-focus configurations, according to some embodiments discussed herein.

Confocal Drill-Down (see, e.g., operation 408 of FIG. 4): There may be places where the mask pattern is so dense that the step removal algorithm fails or its results are uncertain. In this case, the confocal drill-down approach may be employed. Here a diffraction-limited pin-hole located at the back focal plane of the objective lens may be illuminated to project a spot onto the reticle. The reflected light image of this spot may then be re-imaged onto the original pin-hole. When the objective-to-reticle distance is at best focus, the maximum amount of reflected light will pass through the pin-hole as illustrated in FIG. 1. Various methods of identifying the best locations may be used for the confocal drill down approach and a mask-material table may document the thickness of each material to assist in identifying the best locations.

Referring to FIGS. 1 and 4, a time delayed integration (TDI) reflected light frame-mode image may be taken so an algorithm may determine where each sample may occur (e.g., relative to the features in the image). The algorithm may determine the vertical offset for each feature based on the reticle material specification. Image acquisition system (IAS) may insert an intermediate field-plane mask containing, for example, about 30 um holes (e.g., 60* point spread) and take frame-mode images through focus. Using the intensity at each focus offset, the elevation at each point on features of interest (e.g., equal or greater than 1.0 um) may be determined.

Various sources of error may exist during the autofocusing. One of the larger error sources may be "plate topography" which may be defined as the actual height (or depth) of material added to (or removed from) the surface of the mask. Thus, if a mask had a 180 nm thick chrome-on-MoSi border, and a long 200 nm deep trench somewhere in the center, one may see a 380 nm P-P "plate topography" error for any swath in which the autofocus sense "spots" encountered both of these features. The second largest error source may be termed "pattern effect", defined as a spurious perceived height change caused by diffractive interaction between the autofocus sense beams and dense pattern on the plate. For example, some current autofocus sensor design may spuriously indicate a surface up to 150 nm higher than the 100 nm chrome thickness over certain dense patterns on standard chrome-on-glass plates. In an embodiment, this error source may be considered to differ from the plate topography source only in that it may potentially be reduced by changes in the autofocus optical design. To the extent that pattern error continues to exist, it may appear to the system like a change in surface height and in that sense may be functionally identical to, and directly adds to plate topography error.

In an embodiment, determination of what the plate topography errors were may be made in real time, e.g., allowing the errors to be corrected from the control signal instantaneously. This approach would work if we had only to consider chrome-on-glass masks with no dense pattern effects and no trenches. In this relatively uncomplicated situation, we may tell unambiguously (from autofocus signal intensities) whether the autofocus spots were reflecting from the glass surface, or from the chrome surface, which is both more reflective and generally 100 nm higher. For each sample, we would determine which material had been seen, and subtract 100 nm from the measured height for those taken over chrome. This simple correction may be done in real time for each sample, allowing the focus position control system to track the desired quartz surface directly.

In some implementations, the presence of dense pattern, trenches, and numerous materials in addition to chrome may create a situation in which it may be more difficult to unambiguously infer the type of material seen by the autofocus spots, which results in an inability to directly infer the real or apparent depth or thickness of the materials. Thus, if we acquire focus at some general spot in the center of an arbitrary mask, there may be no robust method of determining the local topography or pattern error, which may not allow for correction of this error. This inability to directly determine local topography error at general locations may be addressed by an approach that measures height at particular locations where we do know the local topography a priori, and then do some form of estimation to estimate the focus height between the known areas with acceptably small error. For example, some form of pre-mapping may be used whereby the desired Z trajectory for a given swath would be determined prior to performing that swath.

Figure 2:
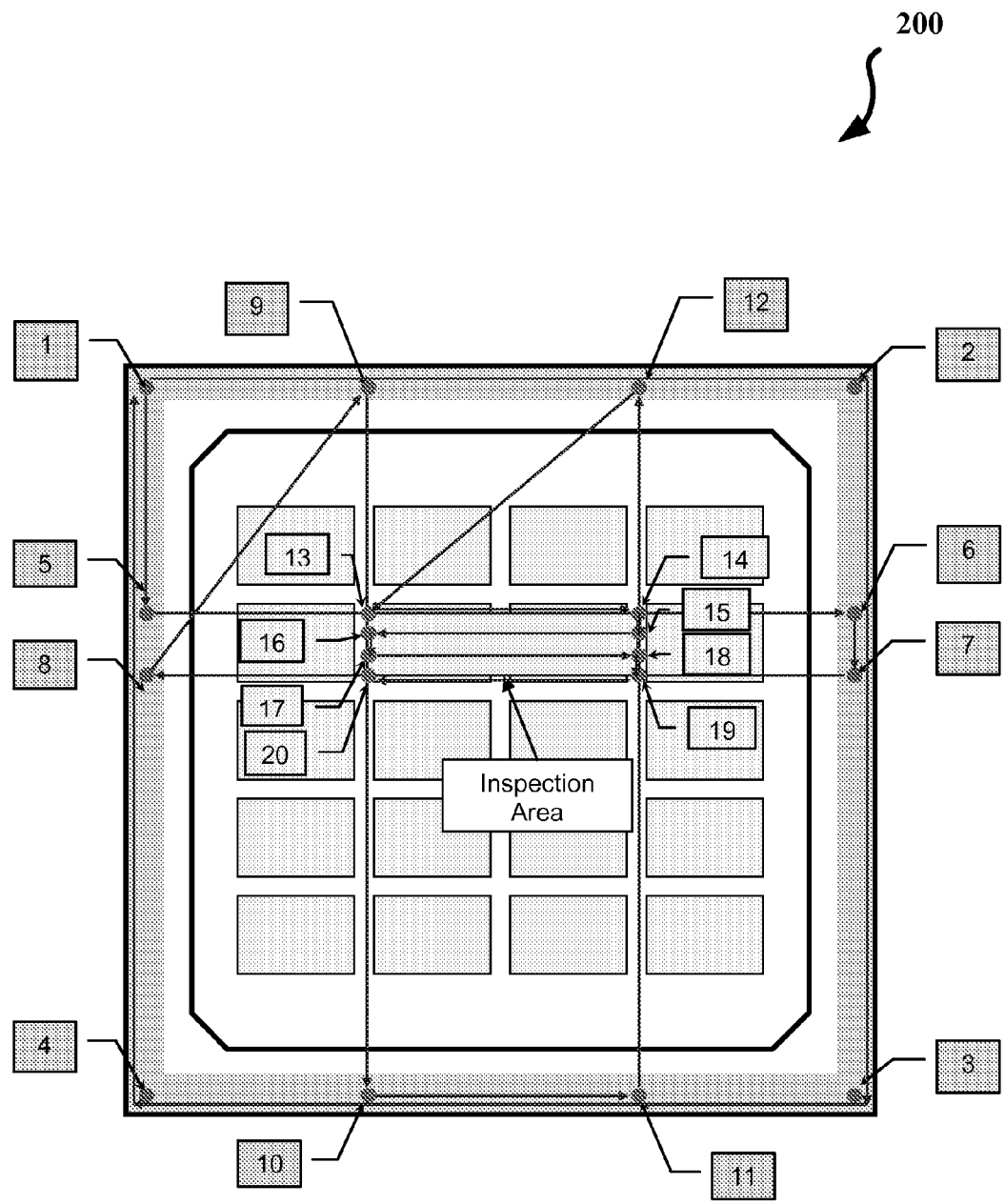
FIG. 2 illustrates a top view of a reticle inspection area, according to an embodiment of the invention.

In one embodiment, assume that the borders of the plate are of uniform material and are a known height from the chrome surface. Assume we want to inspect the area labeled "Inspection Area" in FIG. 2. If we acquire focus at point 1 and move around the edges (to points 2-3-4-1), we may directly map Z(x,y) for the edges, without using any dead reckoning algorithm. Then moving down to point 5, we may then swath to point 6. Note that this swath starts and ends at points of known Z-height, but may require a dead reckoning approach to estimate Z(x) at points in between. In the same way, Z(x) is estimated for the segment between points 7-8, and Z(y) estimated between points 9-10 and 11-12. As subsets of these segments, we've established estimates for Z(x,y) around all four boundaries of the inspection area. The swaths from points 13-14, 15-16, 17-18 and 19-20 are then between points of estimated Z height, and may use dead reckoning to estimate plate Z(x) at points in between. In this version of the high level approach, we assume that the commanded Z height for swath N may be the Z versus X inferred from swath (N−1), offset at the start and end by extrapolated ΔZ versus Y. Thus, the first swath (between points 13-14 in FIG. 1) may be performed twice, first to measure the data from which the dead-reckoned Z versus X may be estimated, and second to follow this Z versus X in position loop. The next swath (from points 15-16 in FIG. 2) may follow the Z versus X determined from the prior swath, but may log data from which to estimate—after the fact—what the surface height between points 15-16 really was. The swath from point 17-18 may follow this estimated height, and so on.

In one embodiment, irrespective of the high level sequence used, a technique to accurately estimate quartz height on a single swath between end points of known height may be used. For example, data shown in table below may be used for this purpose.

TABLE 1

Focus Data

| VARIABLE NAME | DESCRIPTION |
|---|---|
| ECS | Position sensor output. Measures position of the objective relative to the main inspection station granite. Data used to control the "position loop". (e.g., 325 counts per micron = $G_{ECS}$) |
| A1 | Signal from the A side of autofocus bi-cell sensor number 1. Combined with the other three bi-cell readings to form an optical "focus error" signal. |
| B1 | Signal from the B side of autofocus bi-cell sensor number 1. Combined with the other three bi-cell readings to form an optical "focus error" signal. |
| A2 | Signal from the A side of autofocus bi-cell sensor number 2. Combined with the other three bi-cell readings to form an optical "focus error" signal. |
| B2 | Signal from the B side of autofocus bi-cell sensor number 2. Combined with the other three bi-cell readings to form an optical "focus error" signal. |
| S1 | "S-curve" optical sensor output synthesized from A1 and B1 readings by the formula: $S1 = (A1 - B1)/(A1 + B1)$ |
| S2 | "S-curve" optical sensor output synthesized from A2 and B2 readings by the formula: $S2 = (A2 - B2)/(A2 + B2)$ |
| S | Composite S-curve signal calculated as $S = (S1 - S2)/2$ Same gain as the individual S-curve signals, but less susceptible to "pattern effect" |

Though there are some cases in which we may infer geometry height unambiguously from inferred "reflectivity" derived from the A and B readings, this may not be the case, so we may make no initial attempt to use A and B data in this way.

In an embodiment, an outline such as follows may be used for an autofocusing algorithm:

Show details for X swath. Same technique may apply for Y moves.
1) Swath from $X_i$ to $X_f$ using normal nested optical/position loops with basic plate tilt feed forward, logging Focus Data in Table 1.
2) Calculate Zest(x) for swath 0
3) Swath back from $X_f$ to $X_i$, following Zest(x) with position loop, collecting image data and logging focus data for use in the next swath
4) Calculate Zest(x)
5) Estimate $\Delta Z$ at $X_i$ and $X_f$ based on $\Delta Z=(dZ/dY)*\Delta Y$
6) Move $\Delta Y$ to next swath location
7) Offset Zest (x) by $\Delta Z$
8) Swath from $X_i$ to $X_f$, following Zest(x)+$\Delta Z$ with position loop, logging focus data
9) Estimate $\Delta Z$ at $X_i$ and $X_f$, based on $\Delta Z=(dZ/dY)*\Delta Y$
10) Move $\Delta Y$ to next swath location
11) Offset Zest (x) by $\Delta Z$
12) Swath from $X_f$ to $X_i$, following Zest(x)+$\Delta Z$ with position loop, logging focus data
13) Repeat steps 3-12 for rest of inspection In one embodiment, Zest(x) may be calculated as follows:
1) Reconstruct measured height of observed plate surface from ECS and optical sensor data based on: $Z_{TOTAL}=Z_{ECS}-Z_{OPTICAL}=(ECS/G_{ECS})-(S/G_S)$
2) Find apparent transitions from one material/height to another
   a) Filter for abrupt, large changes in $Z_{TOTAL}$:
      i) Calculate running standard deviation (SDZT) of over $Z_{TOTAL}$ a specified window
   b) Calculate sum of focus sensor outputs:
      i) $AB_{SUM}=A1+B1+A2+B2$
   c) Filter for abrupt, large changes in $AB_{SUM}$:
      i) Calculate running standard deviation of $AB_{SUM}$ (SDAB) over a specified window
   d) Create a vector that amplifies the transition by multiplying Z TOTAL and $AB_{SUM}$.
      i) SDAMP=SDZT*SDAB
   e) Identify transitions by thresholding variables
      i) TRANS=1 IF (SDAMP>SDAMP_THRESH OR SDZT>SDZT_THRESH OR SDAB>SDAB_THRESH)
   f) Locate center of transitions
3) Estimate size of ZTOTAL step as transition is crossed.
      i) Linear least squares fit in window before and after transition.
      ii) Calculate offset at center point
4) Apply offsets to ZTOTAL
5) Calculate error at end of swath
6) Correct error (e.g., apply overall slope to end at known Zf (more exotic correction later)

In reference to FIG. 4, in various embodiments, one or more of the following techniques may be utilized to map the surface of a reticle:

Global mapping 406—this approach identifies the altitude of the top surface and translates this patterned-surface-elevation to the underlying quartz/chrome interface;

Confocal drill down 408—this allows an absolute elevation check even in dense pattern areas; and/or Topographic map-following 404—inspection results verify uniform focus offset across the plate.

Moreover, some of the embodiments may utilize an image taken at constant focus offset relative to the quartz surface for autofocusing. Because the focus offset is constant, the algorithm no-longer needs to compensate for test-to-reference image differences that may be due to focus offset. In addition, as three-dimensional effects become more important, knowing the focus offset may allow the algorithm to model the behavior of very narrow lines and spaces appropriately.

Because the mask-substrate is relatively very flat and its lack of flatness may be described by a low-order two-dimensional function, knowing relatively few elevation points may allow the rest of the surface to be predicted. For example, this may be used two ways:

(1) It may disqualify aberrant measurement-points. For instance, if a suitable low-order two-dimensional fit is made to the X/Y data gathered using the step-removal and confocal drill-down approaches, then the elevation of each point may be evaluated in statistical terms and those points that have unlikely errors from the surface (say three-sigma) can be removed and the model re-fitted to the remaining points.

(2) Another approach is to map the un-patterned boarder surrounding the patterned region. This surface can be extended across the patterned region and used as the starting point for the final map. With this starting point fewer points may be required to adequately define the surface map—thereby reducing the mapping time.

Figure 3:
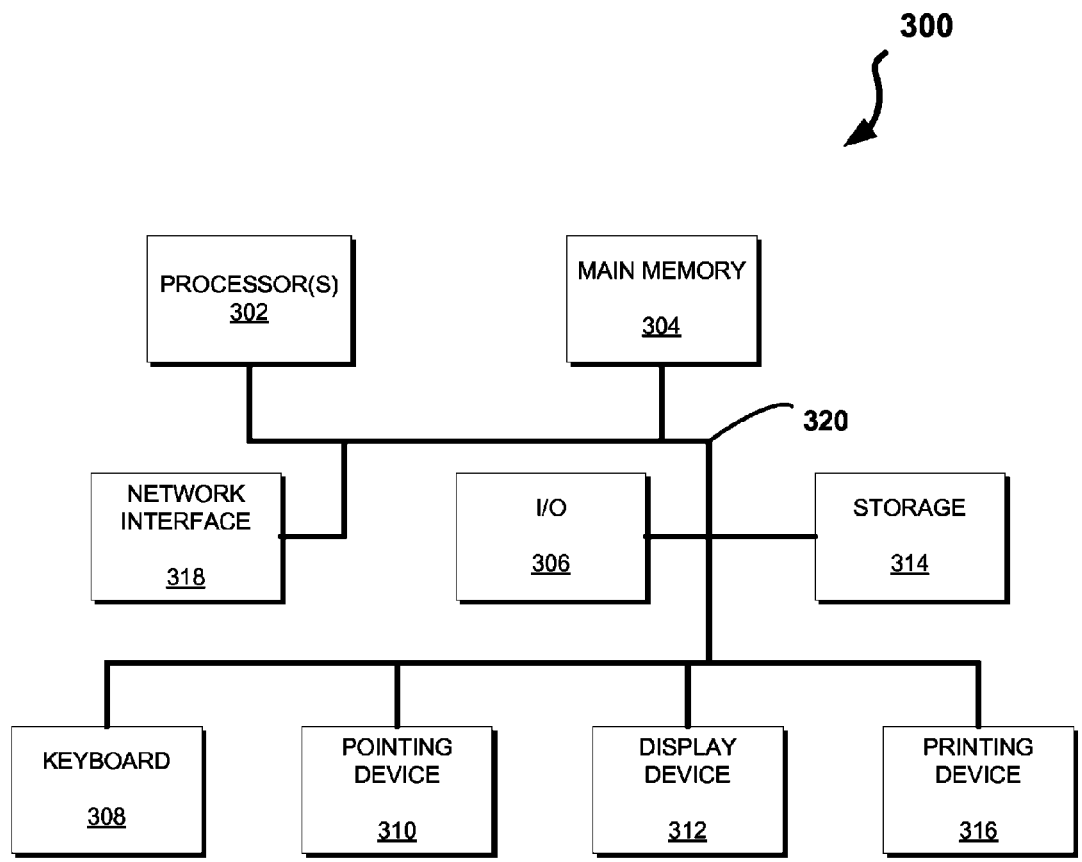
FIG. 3 illustrates a block diagram of computer system that may be utilized in various embodiments of the invention.

FIG. 3 illustrates a block diagram of computer system 300 that may be utilized in various embodiments of the invention. In an embodiment, the system 300 may be utilized to capture and/or manipulate one or more images discussed herein, for example. The system 300 may include one or more processors 302, a main memory 304, an input/output (I/O) controller 306, a keyboard 308, a pointing device 310 (e.g., mouse, track ball, pen device, or the like), a display device 312, a mass storage 314 (e.g., a nonvolatile storage such as a hard disk, an optical drive, or the like), and a network interface 318. Additional input/output devices, such as a printing device 316, may be included in the system 300 as desired. As illustrated in FIG. 3, the various components of the system 300 may communicate through a system bus 320 or similar architecture.

In accordance with an embodiment of the invention, the processor 302 may be a complex instruction set computer (CISC) microprocessor, a reduced instruction set computing (RISC) microprocessor, a very long instruction word (VLIW) microprocessor, a processor implementing a combination of instruction sets, or the like.

Moreover, the network interface 318 may provide communication capability with other computer systems on a same local network, on a different network connected via modems or the like to the present network, or to other computers across the Internet. In various embodiments of the invention, the network interface 318 may be implemented by utilizing technologies including, but not limited to, Ethernet, Fast Ethernet, Gigabit Ethernet (such as that covered by the Institute of Electrical and Electronics Engineers (IEEE) 801.1 standard), wide-area network (WAN), leased line (such as T1, T3, optical carrier 3 (OC3), or the like), analog modem, digital subscriber line (DSL and its varieties such as high bit-rate DSL (HDSL), integrated services digital network DSL (IDSL), or the like), cellular, wireless networks (such as those implemented by utilizing the wireless application protocol (WAP)), time division multiplexing (TDM), universal serial bus (USB and its varieties such as USB II), asynchronous transfer mode (ATM), satellite, cable modem, and/or FireWire.

Moreover, the computer system 300 may utilize operating systems such as Solaris, Windows (and its varieties such as CE, NT, 3000, XP, ME, Vista, or the like), HP-UX, IBM-AIX, PALM, UNIX, Berkeley software distribution (BSD) UNIX, Linux, Apple UNIX (AUX), Macintosh operating system (Mac OS) (including Mac OS X), or the like. Also, in certain embodiments of the invention, the computer system 300 may be a general purpose computer capable of running any number of applications.

FIG. 4 is a flow diagram 400 of a method to automatically focus reticle inspection tools, according to an embodiment. At operation 402, the process to generate a topographical map of the reticle may be initiated. According to an embodiment, the generation of the map may be accomplished through one or more of the topographic surface mapping 404, global mapping 406, and/or confocal drill down mapping 408 processes. Each of the processes may be used independently or in conjunction with the other processes.

According to an embodiment, once the topographical map is generated, the map may be used to focus the lens (410) of the inspection tool, e.g., as the tool inspects a reticle for defects. In some embodiments, the map may need to be updated or corrected (412) to account for errors resulting from, among other things, temperature changes during the inspection process.

In various embodiments of the invention, the operations discussed herein, e.g., with reference to FIGS. 1-4, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include any suitable storage device such as those discussed with respect to FIG. 3.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

In the description and claims, the terms "coupled" and "connected," along with their derivatives, may be used. In some embodiments of the invention, "connected" may be used to indicate that two or more elements are in direct physical contact with each other. "Coupled" may mean that two or more elements are in direct physical contact. However, "coupled" may also mean that two or more elements may not be in direct contact with each other, but may still cooperate or interact with each other.

Although embodiments have been described in language specific to structural features and/or methodological acts, it is to be understood that claimed subject matter may not be limited to the specific features or acts described. Rather, the specific features and acts are disclosed as sample forms of implementing various embodiments. While the invention has been described above in conjunction with one or more specific embodiments, it should be understood that the invention is not intended to be limited to one embodiment. The invention is intended to cover alternatives, modifications, and equivalents as may be included within the spirit and scope of the invention, such as those defined by the appended claims.

The invention claimed is:

1. A method for inspecting a reticle for defects, the method comprising the steps of:
   mapping the reticle with an instrument that measures and records a height Z of an upper surface of the reticle while recording X and Y coordinates of the height measurements,
   compiling the recorded X, Y, and Z data into a topographical map of the reticle, and
   after the map is produced, optically inspecting the reticle with an instrument that detects defects at the upper surface of the reticle, using the map as an input to focus a lens of the instrument at the Z height when the lens is disposed by the machine at the associated X-Y coordinate of the reticle.

2. The method of claim 1, wherein the map is generated in accordance with one or more of: a confocal drill down process, a global mapping process, or a topographical map-following process.

3. The method of claim 2, wherein the confocal drill down process comprises:
   transmitting a beam through a diffraction-limited pin-hole located at a back focal plane of the lens; and
   determining the elevation of the location based on a measurement of a reflection of the transmitted beam.

4. The method of claim 2, wherein the global mapping process comprises:
   determining a first two-dimensional elevation map at a first location on the reticle;
   determining a second two-dimensional elevation map at a second location on the reticle; and
   determining a three-dimensional map of the reticle based on the first and second two-dimensional elevation maps.

5. The method of claim 2, wherein the topographical map-following process comprises:
   generating a topographical map of the reticle;
   determining a focus offset; and
   focusing the lens based on the topographical map and the determined offset.

6. The method of claim 5, further comprising correcting for drift in the focus offset based on periodical measurements.

7. The method of claim 1, wherein the map is updated in response to temperature variations.

8. A computer-readable medium containing one or more instructions that when executed on a processor configure the processor to:
   map the reticle with an instrument that measures and records a height Z of an upper surface of the reticle while recording X and Y coordinates of the height measurements,
   compile the recorded X, Y, and Z data into a topographical map of the reticle, and
   after the map is produced, optically inspect the reticle with an instrument that detects defects at the upper surface of the reticle, using the map as an input to focus a lens of the instrument at the Z height when the lens is disposed by the machine at the associated X-Y coordinate of the reticle.

9. The computer-readable medium of claim 8, wherein the one or more instructions configure the processor to generate the map in accordance with one or more of: a confocal drill down process, a global mapping process, or a topographical map-following process.

10. The computer readable medium of claim 9, wherein the one or more instructions configure the processor to generate the map according to a confocal drill down process comprising:
    transmitting a beam through a diffraction-limited pin-hole located at a back focal plane of the lens; and
    determining the elevation of the location based on a measurement of a reflection of the transmitted beam.

11. The computer readable medium of claim 8, wherein the one or more instructions configure the processor to generate the map according to a global mapping process comprising:
    determining a first two-dimensional elevation map at a first location on the reticle;

determining a second two-dimensional elevation map at a second location on the reticle; and determining a three-dimensional map of the reticle based on the first and second two-dimensional elevation maps.

12. The computer readable medium of claim 8, wherein the one or more instructions configure the processor to generate the map according to a topographical map-following process comprising:

generating a topographical map of the reticle;

determining a focus offset; and focusing the lens based on the topographical map and the determined offset.

13. The computer readable medium of claim 8, wherein the one or more instructions configure the processor to update the map in response to temperature variations.

* * * * *